United States Patent [19]

Barker

[11] Patent Number: 5,184,215
[45] Date of Patent: Feb. 2, 1993

[54] LIGHTNING DETECTING AND RECORDING SYSTEM

[75] Inventor: Philip P. Barker, Schenectady, N.Y.

[73] Assignee: Niagara Mohawk Power Corporation, Syracuse, N.Y.

[21] Appl. No.: 800,454

[22] Filed: Nov. 26, 1991

[51] Int. Cl.$^5$ ............................................. H04N 7/18
[52] U.S. Cl. .................................... 358/93; 358/108; 360/5
[58] Field of Search ................. 358/93, 108, 229, 209; 360/5, 6; 354/76

[56] References Cited

U.S. PATENT DOCUMENTS 4,281,354 2/1981 Conte ........................... 358/105 X Primary Examiner—Victor R. Kostak
Attorney, Agent, or Firm—Heslin & Rothenberg

[57] ABSTRACT

An automated system for detecting and recording lightning strikes in the vicinity of power lines. In one embodiment of the invention, the automated system includes a toroid surge sensor; a phototransistor optical sensor located within a pole mounted housing; a magnetic loop sensor; a control circuit for, one or more cameras and/or video camcorders; and a power supply all contained within a weather-tight housing. The sensors are used to detect a lightning strike and to output a signal which is transmitted via the control circuit to activate the cameras or camcorder.

39 Claims, 4 Drawing Sheets

LIGHTNING DETECTING AND RECORDING SYSTEM

BACKGROUND OF THE INVENTION

1. Technical Field

This invention relates in general to a lightning detecting and recording system and, in particular, to a system for detecting and recording lightning strikes in the vicinity of overhead power lines.

2. Background of the Art

As used herein, a lightning flash refers to an entire lightning event which comprises one or more lightning strokes. Thus, a single lightning flash may comprise the detected lightning stroke and one or more related lightning strokes.

For many years, the effects of lightning strikes on external structures have been studied. For example, U.S. Pat. No. 3,759,152 describes an automated monitoring and recording system designed to locate and photograph lightning strikes occurring around sites from which space vehicles are launched. The automated system includes a camera positioned within a housing such that the camera lens faces directly upwards. The camera has an electrically operated shutter with means for advancing the film in the camera after activation of the shutter. A clock is positioned directly over the camera lens so that when the shutter is activated the exact time when such takes place is recorded on the film. An antenna is used to sense an electrical discharge generated from a lightning strike which in turn is used by a controller to activate the camera.

Information to be gained from studies of lightning effects is invaluable to the design and protection of many structures such as power lines. As defined herein, power lines include, but are not limited to, power transmission lines, power distribution lines, telephone lines and cable lines. Despite the best efforts of industry to devise improved protection schemes for power systems, lightning continues to be a major cause of power line and equipment failures. This is primarily because there remains insufficient understanding of the failure mechanisms associated with lightning. For example, in order to better understand the nature of lightning damage on power systems and in particular power lines, information such as the strike location relative to the power line and a visual record of the line during the strike is needed. None of the prior art devices are particularly well suited for recording lightning strikes in the vicinity of power lines.

SUMMARY OF THE INVENTION

Briefly described, in one embodiment of the invention, an automated system for detecting and recording a lightning strike in the vicinity of a power line is described. This system includes a housing having at least one viewport, first automated means which detects a magnetic field disturbance resulting from a lightning strike in the vicinity of the power line and second automated means which detects light indicative of a lightning strike in the vicinity of the power line. The first automated means outputs a first signal representative of a lightning strike when a lightning strike is detected and the second automated means outputs a signal when light is detected. The system further includes filtering means which filters the signal output from the second automated means and outputs a second signal representative of a lightning strike when the output signal from the second automated means is above a preselected level; control means coupled to receive the output of the first automated means and the filtering means and outputting therefrom a third signal in response to receiving at least one of the first signal and the second signal; and visual recording means responsive to the output of the control means in which a lightning strike or a subsequent lightning strike in a flash is visually recorded.

In another aspect of the invention, an automated system for detecting and recording lightning strikes in the vicinity of a power line includes automated means which detects a lightning strike in the vicinity of a power line and outputs a first signal representative of the lightning strike when the lightning strike is detected; control means coupled to receive the output of the automated detecting means and outputting a second signal in response to receipt of the first signal; and visual recording means responsive to the output of the control means in which a lightning strike or a subsequent lightning strike in a flash is visually recorded. In addition to the above, the visual recording means includes a video camcorder and the control means includes timing circuitry to control the activation of the camcorder for a preselected amount of time.

In yet a further aspect of the invention, an automated system for detecting and recording lightning strikes in the vicinity of a power line includes a housing having a viewport; automated means which detects a lightning strike in the vicinity of a power line and outputs a first signal representative of the lightning strike when the lightning strike is detected; control means coupled to receive the output of the automated detecting means and outputting a second signal in response to receipt of the first signal; and visual recording means responsive to the output of the control means in which a lightning strike or a subsequent lightning strike in a flash is recorded. The recording means is located within the housing adjacent to at least one viewport in order to visually record a lightning strike or a subsequent lightning strike in a flash through the viewport. The recording means further includes a camera having a light level and a shutter speed and the control means further includes means in which the light level and shutter speed of the camera is precalculated on a periodic basis.

Further details of the invention are described and claimed herein.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description taken in conjunction with accompanying drawings in which:

DETAILED DESCRIPTION OF THE INVENTION

Summarily, a lightning detecting and recording system in accordance with the present invention is used to detect an occurrence of one or more lightning strikes and to activate one or more cameras/camcorders to photograph or record the detected strike or subsequent lightning strikes in a flash on structures, such as power poles and their associated lines or other objects. As used herein, power poles and their associated lines refer to power distribution, power transmission, telephone and cable poles and lines as well as any other poles having overhead lines.

Figure 1:
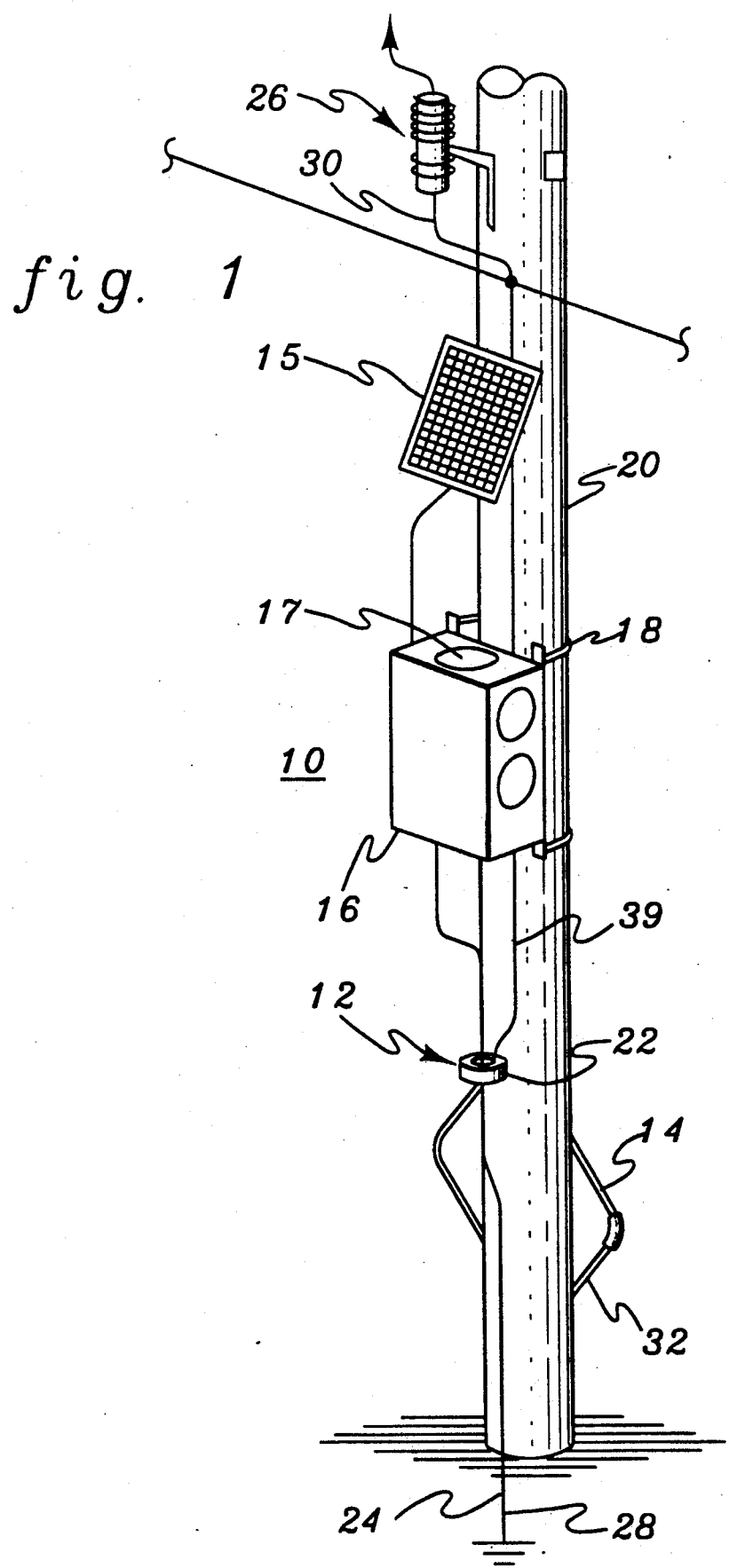
FIG. 1 is a perspective view of one embodiment of a lightning detecting and recording system in accordance with the present invention, in which the system is mounted on a pole, such as a power pole.

One embodiment of the lightning detecting and recording system (10) in accordance with the present invention is depicted in FIG. 1. System (10) includes, for example: a toroid surge sensor (12), a phototransistor optical sensor located within a pole mounted housing (16), a magnetic loop sensor (14); and a control circuit, one or more cameras and/or video camcorders, and a power supply, all contained within housing (16). In a specific embodiment, the power supply for system (10) is solar powered and, e.g., is driven by collector (15).

As noted, many of the major components of system (10) are contained within a weather-tight, protective housing (16). Housing (16) is preferably portable and compact, for example, approximately 24"×24"×12", and is mounted by any suitable means (such as by a U-shaped bracket (18)) to, e.g., a power pole (20). In an alternative embodiment, however, housing (16) can be free-standing and located in close proximity but remote from the power pole to be monitored.

Housing (16) includes a top, a bottom and at least one side wall. It further includes one or more viewports (17) which are located on the top, bottom and/or side wall of housing (16). Viewports (17) are manufactured of a clear material, such as plastic or glass, and function to allow light to enter housing (16) through the viewports and/or to allow camera(s)/camcorder(s) located within the housing to photograph or record lightning strikes in a flash through viewports (17).

As explained more fully below, lightning detecting and recording system (10) is activated when toroid surge sensor (12), the optical sensor contained within housing (16) or magnetic loop sensor (14) detects a lightning strike and transmits a signal to activate the camera(s)/camcorder(s) located within housing (16). The specifics of each of these sensors is explained below.

Toroid surge sensor (12) preferably includes a toroidally shaped coil (22), a conventional surge arrester pole ground wire (24) and a surge arrester (26). Coil (22) is an air core toroidal coil which is, for example, approximately four to six inches in diameter and consists of approximately 100 turns of copper wire wrapped around the air core form. The surge arrester pole ground wire (24) runs through the center of the toroid. Wire (24) is connected to ground at its lower end (28) and at its upper end (30), it is connected to a conventional surge arrester (26), such as a metal oxide or silicon carbide arrester, which is connected to a standard phase conductor (not shown). Toroid surge sensor (12) and arrester (26) are mounted by any suitable means to pole (20). Toroid sensor (12) is triggered when current caused by one or more lightning strikes travels through ground wire (24) and creates a magnetic flux change inside loop (22) thereby generating a voltage output.

The phototransistor optical sensor located within housing (16) includes a standard, commercially available phototransistor. In addition, it includes a first order high pass filter (not shown). As is known in the art, light causes the optical sensor to conduct. Therefore, the sensor is situated within housing (16) adjacent to one of viewports (17) such that light penetrating at least one of viewports (17) may reach the sensor. The light can be a result of, for example, daylight from a rising sun, headlights from a passing vehicle or light resulting from a lightning strike. For purposes of this invention, however, it is desirable to have a camera or camcorder activated only when a lightning strike occurs. Therefore, a high pass filter is coupled to the optical sensor. The characteristics of this filter are such that only rapid light level changes, such as those resulting from a lightning strike, pass through the filter thereby activating the camera(s) and/or camcorder.

Magnetic loop sensor (14) is capable of detecting a lightning strike which is close to the power line or, for example, 5-10 km away. It operates on the principle that current associated with, for example, cloud to ground lightning strikes creates a changing magnetic field disturbance which cuts through a magnetic loop antenna (32) causing a voltage output. Loop antenna (32) is, for example, diamond-shaped having a one meter cross-sectional area and is made of approximately 100 turns of copper wire. Loop (32) has directional characteristics. For example, if the plane of loop (32) is positioned parallel to the power line, then the loop has maximum sensitivity in a direction parallel to the power line.

In one preferred embodiment, all three of the above-described sensors, toroid surge sensor (12), magnetic loop sensor (14) and the optical sensor are used to detect lightning strikes, thus providing a greater chance that relatively remote strikes are sensed. However, it is understood that each of the above sensors may be used alone or in combination with another sensor. For example, in one embodiment, magnetic loop sensor (14) may be used independent of the other sensors or it may be used in combination with, for instance, surge sensor (12).

Figure 2:
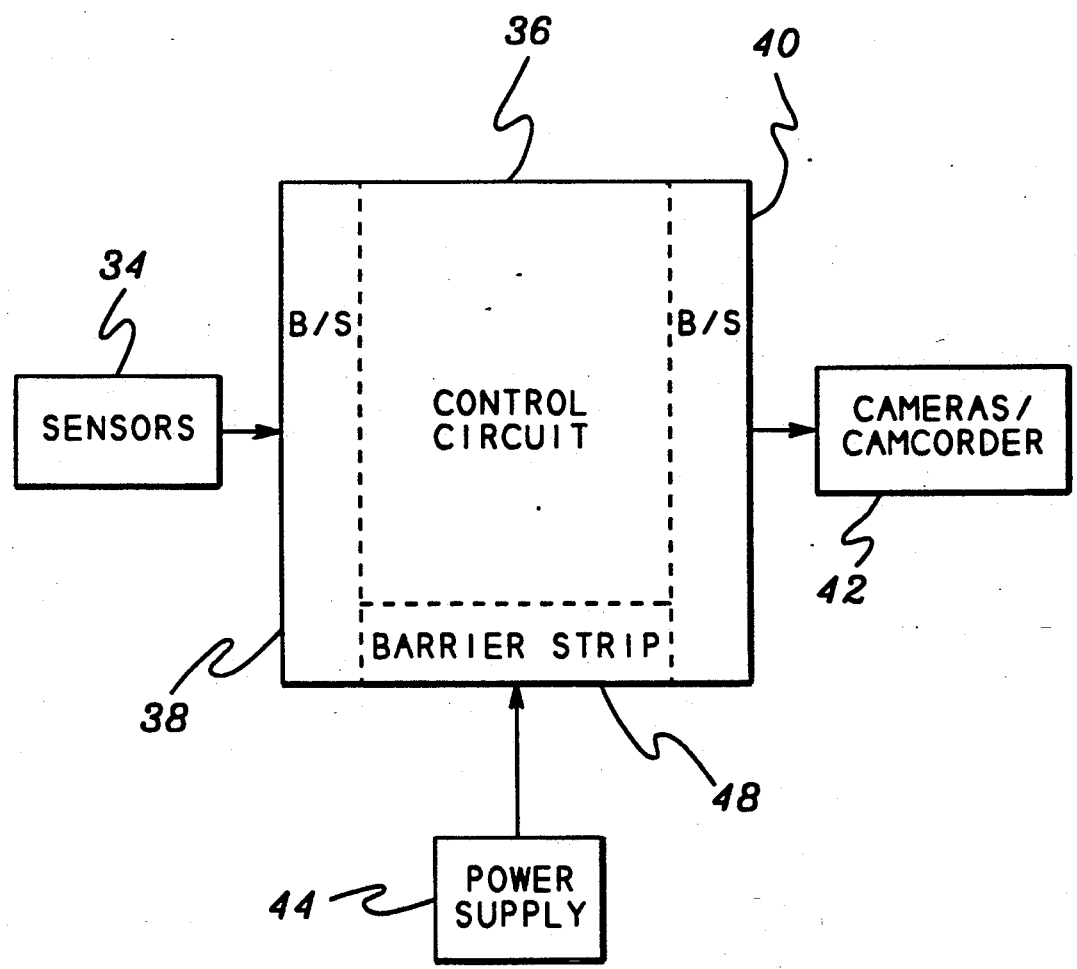
FIG. 2 is a block diagram of the main components of the lightning detecting and recording system of FIG. 1.

As shown in FIG. 2, the three sensors, collectively referred to as sensors (34), are coupled to a control circuit (36) via a connection, such as a conventional barrier strip (38) (indicated by the legend B/s). The connection to barrier strip (38) is facilitated by lead wires attached to sensors (34) (see for example, lead wire (39) of FIG. 1 attached to toroid surge sensor (12)).

Control circuit (36) is further electrically connected via a barrier strip (40) (indicated by the legend B/s) to one or more cameras/camcorder, generally denoted (42). Control circuit (36) is also further coupled to a power supply (44) via a barrier strip (48). As noted earlier, power supply (44) may be a solar power supply driven by collector (15) (see FIG. 1). In a specific embodiment, however, power supply (44) may also include a backup battery, such as a standard gel cell lead acid type battery containing enough charge to run system (10) for a couple of weeks. The battery is also charged by solar power driven by, for example, collector (15).

Figure 3:
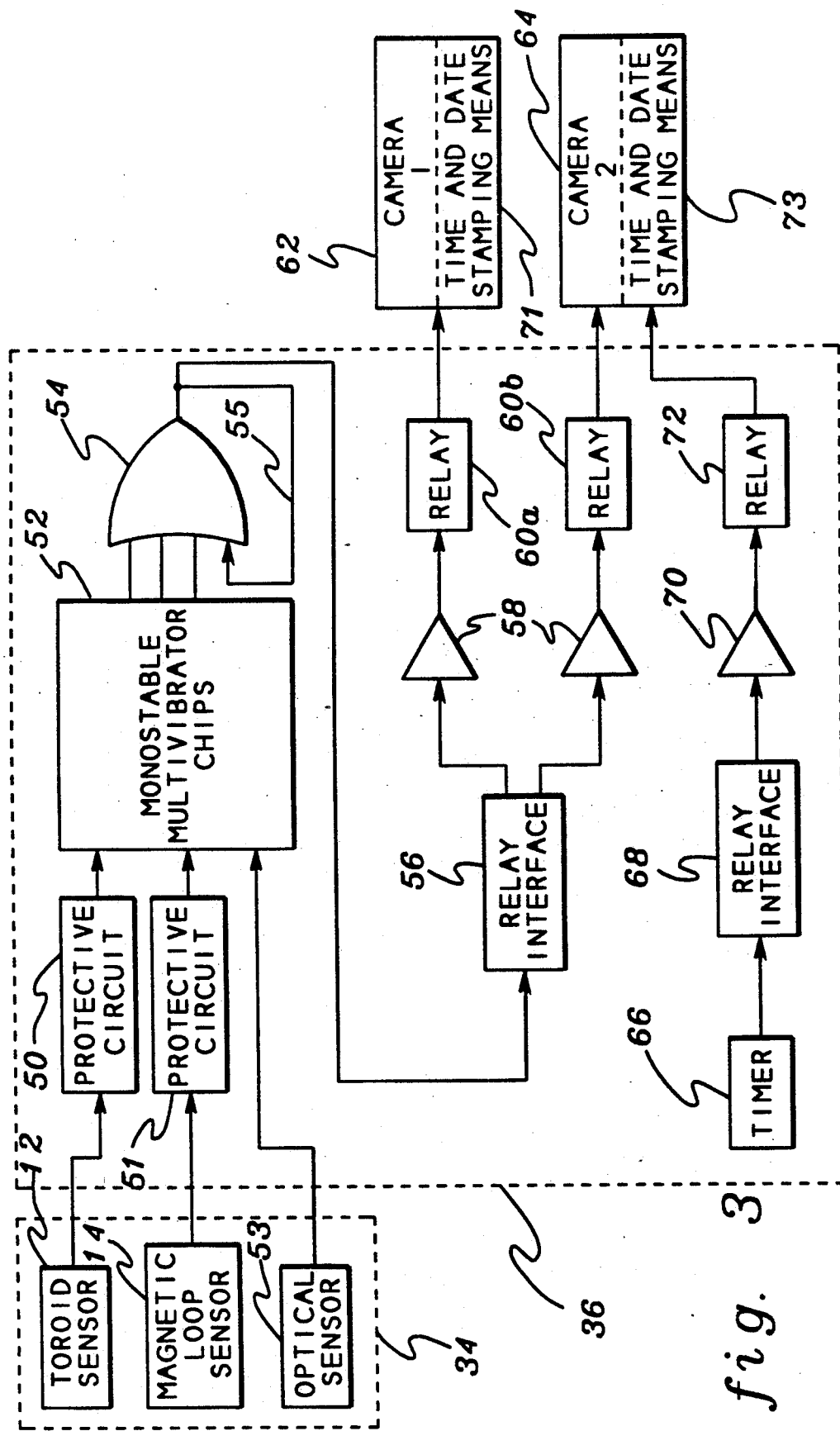
FIG. 3 is a block diagram of one embodiment of the lightning detecting and recording system of FIG. 1 in which the system includes two cameras for photographing lightning strikes.

Referring to FIG. 3, control circuit (36) contains the logic circuitry necessary to activate the cameras (to be explained below) which photograph one or more lightning strikes in a flash when an output signal is received from sensors (34). The circuitry associated with control circuit (36) is described in detail below.

In one embodiment, since toroid surge sensor (12) is capable of producing a high output voltage, i.e., a voltage over 20 volts, sensor (12) is connected to a protective circuit (50). Functionally, protective circuit (50) reduces the voltage output signal produced by sensor (12) when lightning is detected (as described above) to less than 20 volts, thereby reducing the chance of damage to subsequent circuits of control circuit (36).

Protective circuit (50) includes, for instance, a full wave bridge rectifier (used to change the polarity of the output voltage to a unitary polarity), a conventional metal oxide varistor (to clip off any high voltages, i.e. over 20 volts), and a conventional optical isolator (to further isolate the voltage signal thereby protecting subsequent logic circuitry). Protective circuit (50) is coupled to monostable multivibrator chips (52) such that the output of protective circuit (50) is received as input to monostable multivibrator chips (52) (discussed further below).

Similar to toroid surge sensor (12), magnetic loop sensor (14) is also capable of producing a high output voltage signal when a lightning strike is detected. Therefore, loop sensor (14) is connected to a protective circuit (51), which is similar to circuit (50) described above. Protective circuit (51) includes, for instance, a full wave bridge rectifier and a conventional metal oxide varistor (described above), a conventional adjustable resistive divider (to adjust the sensitivity of the magnetic input), a standard buffer amplifier (to boost the signal) and an optical isolator (as described above). Protective circuit (51) is also further coupled to monostable multivibrator chips (52) such that the output of protective circuit (51) is received as input to monostable multivibrator chips (52) (described further below).

Unlike toroid surge sensor (12) and magnetic loop sensor (14), phototransistor optical sensor (53) does not produce a high output voltage and therefore, it is coupled directly to monostable multivibrator chips (52) bypassing any protective circuits.

As described above, protective circuit (50), protective circuit (51) and optical sensor (53) are coupled to standard monostable multivibrator chips (52). In one embodiment, three multivibrator chips are used, one for each sensor, i.e., toroid sensor (12), magnetic loop sensor (14) and optical sensor (53). Functionally, multivibrator chips (52) are used to maintain a high signal for a predetermined amount of time in order to activate the cameras (explained below). As is known in the art, the function of monostable multivibrator chips (52) may be accomplished in a number of ways including, but not limited to, utilizing standard logic gates with feedback loops.

Monostable multivibrator chips (52) are coupled to a conventional OR gate (54), which is further connected to a relay interface (56). OR gate (54) is, for example, a standard 4-input OR gate in which three of the inputs are connected to the outputs of monostable multivibrator chips (52) and one input is connected as a feedback loop (55). In this embodiment, feedback loop (55) is open circuited by methods known in the art; however, feedback loop (55) is explained fully below with the discussion of FIG. 4.

Relay interface (56) preferably includes a standard buffer amplifier and one or more monostable multivibrator chips (not shown). Relay interface (56) functions to amplify the output signal received from OR gate (54) using the buffer amplifier and to maintain this signal for a predetermined amount of time utilizing one or more monostable multivibrator chips, as described above. Relay interface (56) is coupled to drivers (58).

Drivers (58) are standard bipolar transistors. The base of the transistors receive the output signal from relay interface (56) forcing the transistors into conduction. The current caused by the conduction flows through standard relays (60a, 60b) manufactured by, for example, Magnecraft having a Part No. W172DIP-37. The output of relays (60a, 60b) are coupled to cameras (62, 4) via lead lines (not shown) from the cameras to barrier strip (40) of control circuit (36) (FIG. 2).

Camera (62) is, for example, a Nikon N-2000 35 mm SLR camera, and camera (64) is, for example a Canon EOS630 35 mm camera. Camera (64) is advantageously capable of taking a photograph within 12 milliseconds which helps to ensure that the detected lightning strike is photographed. However, in order to activate camera (64) within 12 milliseconds, the light level and shutter speed of the camera must be periodically readjusted by the control circuit. Therefore, additional circuitry is added in order to ensure that the light level and shutter speed are precalculated and kept at the appropriate levels for taking a properly exposed photograph. The additional circuitry includes a timer (66), a relay interface (68), a driver (70), and a relay (72). The function and components of these additional circuits is described below.

Functionally, the additional circuitry works together in order to open and close relay (72) which calculates the proper light level and shutter speed for taking a photograph. As briefly mentioned above, the circuitry used to periodically recalculate the light level and shutter speed includes timer (66). Timer (66) may be, for example, one or more conventional decade counters which are configured to have an adjustable timeout period from, for example, 90 seconds up to approximately 15 minutes. Timer (66) is coupled to relay interface (68) which is similar to relay interface (56) described above. Interface (68) amplifies the output signal received from timer (66) and produces a relatively long square wave pulse, as is also described above. Interface (68) is further coupled to driver (70), which receives the amplified signal from interface (68). Driver (70) is further coupled to relay (72), such that the output of driver (70) is input to relay (72). The input signal to relay (72) causes relay (72) to open for a predetermined amount of time and then close, thereby recalculating the appropriate light level and shutter speed for taking a properly exposed photograph. Driver (70) and relay (72) are similar to drivers (58) and relay (60), also previously described.

As described in detail above, in one embodiment, system (10) includes one or more cameras (62, 64) which are activated when toroid surge sensor (12), magnetic loop sensor (14) or optical sensor (53) (all of which are coupled to cameras (62, 64) through control circuit (36)) senses a lightning strike and produces an output signal indicative of a lightning strike. When the output signal is received by cameras (62, 64) photographs of the lightning strike or a subsequent lightning strike in a flash are taken. In one embodiment, the number of photographs taken is tracked. This is accomplished by adding a conventional digital counter (not shown) to system (10). The digital counter is installed by any known means on, for example, the underside of housing (16) (FIG. 1). It is coupled to cameras (62, 64) by connecting standard lead wires which are attached to the digital counter (not shown) to drivers (58).

In addition to the above, the cameras further include means for time and date stamping (71, 73) the photograph so that it is possible to determine when the lightning strike occurred.

Figure 4:
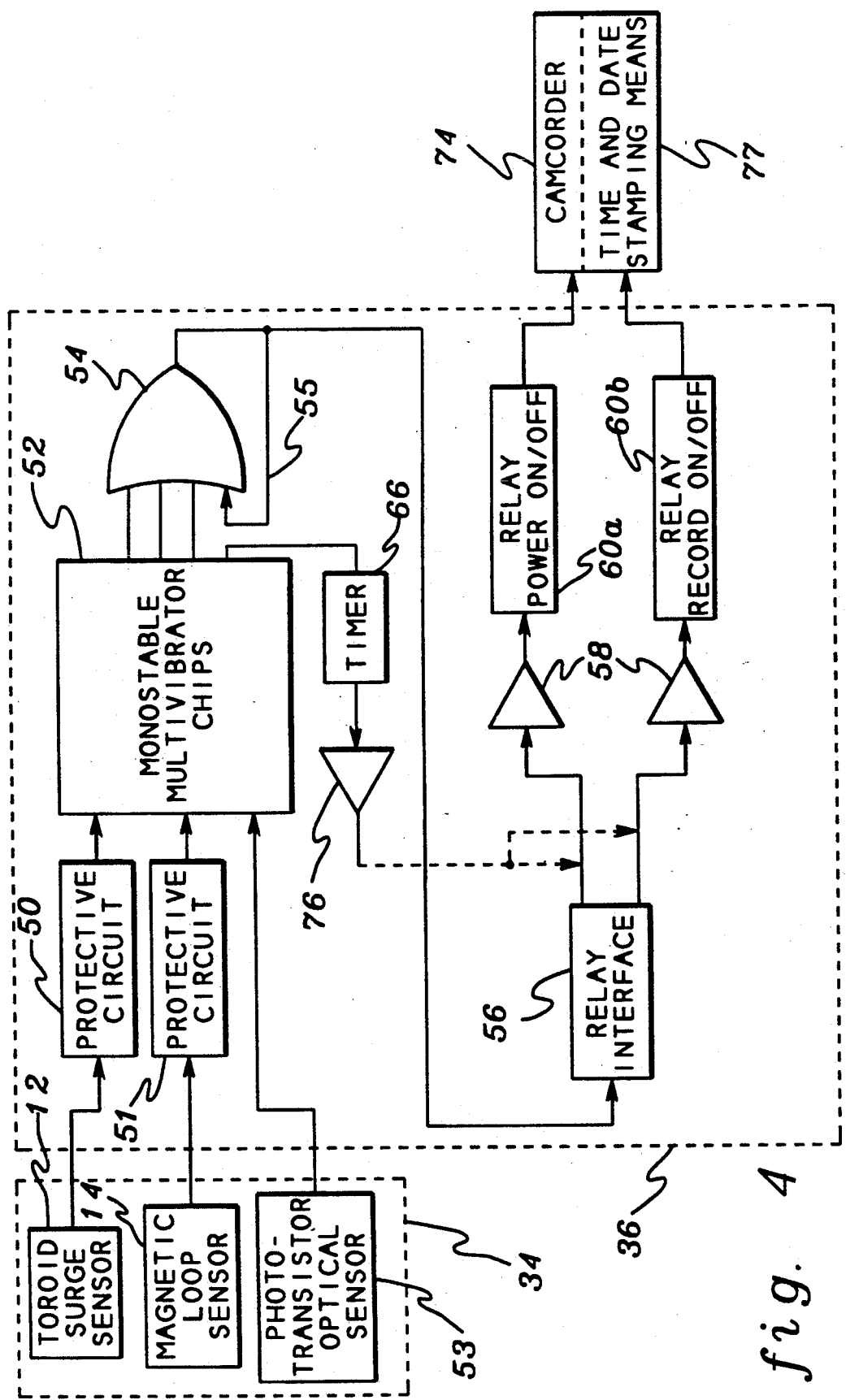
FIG. 4 is a block diagram of one embodiment of the lightning detecting and recording system of FIG. 1 in which the system includes a video camcorder for recording lightning strikes.

In an alternate embodiment, referring to FIG. 4, video camcorder (74) is used to record the occurrence of lightning strikes. As is described more fully below, camcorder (74) is activated when either toroid surge sensor (12), magnetic loop sensor (14) or phototransistor optical sensor (53) detects a lightning strike and transmits a signal to camcorder (74) via control circuit (36). In a preferred embodiment, camcorder (74) is activated when a distant lightning strike, for instance, 5-10 km away, is sensed by, for example, magnetic loop sensor (14). Once camcorder (74) is activated, it records subsequent lightning strikes for a predetermined amount of time, thereby enabling an approaching storm to be detected and videotaped.

Many of the components used in order to activate camcorder (74) are similar to those components used to activate cameras (62, 64) (FIG. 3). The similar components are referenced by like numbers and are, therefore, only described briefly below. The components which have not been described above are described in detail below.

As previously mentioned and as depicted in FIG. 4, lightning detection sensors (34) are coupled to control circuit (36) via barrier strip (38) (FIG. 2) which is further coupled to camcorder (74) via a conventional connection, such as barrier strip (40) (see FIG. 2). Specifically, toroid surge sensor (12) is coupled to protective circuit (50) and magnetic loop sensor (14) is coupled to protective circuit (51) (described above). Protective circuits (50, 51) as well as phototransistor optical sensor (53) are connected to monostable multivibrator chips (52).

As described above, monostable multivibrator chips (52) are further connected to OR gate (54) and timer (66)(to be explained below). OR gate (54) is a conventional 4-input OR gate in which three of the inputs are outputs of the three monostable multivibrator chips (52) and the fourth input is a feedback loop (55). Feedback loop (55) is used to prevent reactivating camcorder (74) once it is started. This is desired since reactivating will cause a disruption of recording resulting in possible lost information. Feedback loop (55) prevents reactivating by latching OR gate (54) once it goes high and maintaining this state for a predetermined amount of time (described below). As is known in the art, feedback loop (55) can be constructed in a number of ways.

As shown in FIG. 4 and described with reference to FIG. 3, the output of OR gate (54) is further coupled to relay interface (56) such that the output signal of OR gate (54) is input to interface (56). Interface (56) is further coupled to drivers (58) which are coupled to relays (60a, 60b). Relays (60a, 60b) are coupled to camcorder (74) such that the outputs of relays (60a, 60b) are input to camcorder (74) resulting in activation and termination of camcorder (74) (discussed further below).

As briefly mentioned above, the output of monostable multivibrator chips (52) is also connected to timer (66). Timer (66) may be, for example, one or more conventional decade counters which are configured by known techniques to enable camcorder (74) to remain on for a predetermined amount of time, for example, 15 minutes. Should another lightning strike be detected during that predetermined amount of time, the output signal from monostable multivibrator chips (52) is input to timer (66) thereby resetting timer (66). This timing process allows video camcorder (74) to continue recording the lightning strikes and their effects until a lightning storm has ended or until the videotape runs out.

The output of timer (66) is coupled to a driver (76) (similar to drivers (58)) which is used to amplify the output signal from timer (66). The output of driver (76) is coupled to the input of drivers (58) enabling relay (60a) "Relay Power ON/OFF" to turn the power on for video camcorder (74), and after a short delay (the delay can be performed by any known techniques in the art), to enable relay (60b) "Relay Record ON/OFF" to turn the record function on for camcorder (74). As described above, once camcorder (74) is activated, it continues to record for a predetermined amount of time, which is controlled by timer (66). When the predetermined amount of time has elapsed, however, camcorder (74) is turned off. This is accomplished by sending a pulse from timer (66) to relay (60b) "Relay Record ON/OFF" in order to turn the record function off and then after a short delay (as described above) causing relay (60a) "Relay Power ON/OFF" to turn the power off to camcorder (74). Note that the sequence to turn camcorder (74) off is opposite the sequence to turn it on. In other words, in order to turn camcorder (74) on, the power must be turned on and then, the record. However, to turn video camcorder (74) off, the record must be shut off before the power.

As previously mentioned, in addition to the above circuitry, system (10) may further include a conventional digital counter (not shown). When system (10) includes video camcorder (74), the digital counter tracks the amount of time in which the camcorder has been recording. This tracking allows a user of system (10) to determine whether any lightning has been detected and the amount of time in which the camcorder has recorded without opening housing (16) and without removing the videotape. As discussed above, the digital counter is installed by any known means on, for example, the underside of housing (16) (FIG. 1). It is coupled to video camcorder (74) (FIG. 4) by attaching the lead wires from the digital counter (not shown) to timer (66) in any known manner.

Further, the video camcorder includes means for time and date stamping (77) the recording so that it is possible to determine when the lightning strike occurred.

Although two embodiments of a system for detecting and recording one or more lightning strikes in a flash in accordance with the present invention have been described in detail, other embodiments are possible. These include, for instance, utilizing one or more cameras in combination with one or more video camcorders, using multiple camcorders and/or using various types or models of cameras/camcorders.

As can be seen from the foregoing, a system for detecting and recording lightning strikes in a flash has been described herein. Although two embodiments have been depicted and described in detail herein, it will be apparent to those skilled in the relevant art that various modifications, additions, substitutions and the like can be made without departing from the spirit of the invention, and these are therefore considered to be within the scope of the invention as recited in the appended claims.

What is claimed is:

1. An automated system for detecting and recording a lightning strike in the vicinity of a power line, said system comprising:

a housing having at least one viewport;

first automated means for detecting a magnetic field disturbance resulting from said lightning strike in the vicinity of said power line, said first automated means outputting a first signal representative of said lightning strike when said lightning strike is detected;

second automated means for detecting light resulting from said lightning strike in the vicinity of said power line, said second automated means outputting a signal when light is detected;

means for filtering said signal output from said second automated means, said filtering means outputting a second signal representative of said lightning strike when said output signal from said second automated means is above a preselected level;

control means coupled to receive the output of said first automated means and the output of said filtering means, said control means outputting a third signal in response to receiving at least one of said first signal and said second signal; and means responsive to the output of said control means for visually recording said lightning strike and a subsequent lightning strike in a flash in the vicinity of said power line, said recording means being located within said housing adjacent said at least one viewport for visually recording said lightning flash through said viewport.

2. The automated system of claim 1, wherein said housing has a top, a bottom and at least one side wall, said housing including a plurality of viewports, each of said viewports being positioned in one of said top, said bottom and said side wall.

3. The automated system of claim 2, wherein said recording means includes a video camcorder, said video camcorder being located within said housing adjacent one of said viewports for visually recording of at least one of said lightning strike and said subsequent lightning strike in a flash through said viewport.

4. The automated system of claim 3, wherein said control means includes timing circuitry for controlling activation of said video camcorder to record at least one of said lightning strike and said subsequent lightning strike in a flash in the vicinity of said power line, said timing circuitry including means for continuing said camcorder activation for a preselected amount of time.

5. The automated system of claim 4, wherein said timing circuitry includes means for terminating said camcorder activation after said preselected amount of time.

6. The automated system of claim 5, wherein said timing circuitry includes a counter for tracking said preselected amount of time.

7. The automated system of claim 2, wherein said video camcorder includes means for time stamping and date stamping said visual recording of at least one of said lightning strike and said subsequent lightning strike in a flash.

8. The automated system of claim 2, wherein said recording means includes a plurality of video camcorders, each of said video camcorders being located within said housing adjacent one of said viewports for visual recording of at least one of said lightning strike and said subsequent lightning strike in a flash in the vicinity of said power line.

9. The automated system of claim 2, wherein said recording means includes a camera, said camera being located within said housing adjacent one of said viewports for visual photographing of at least one of said lightning strike and said subsequent lightning strike in a flash through one of said viewports, said recording means including means for calculating a light level and a shutter speed for said camera.

10. The automated system of claim 9, wherein said control means includes means for precalculating on a periodic basis said light level and said shutter speed for said camera, said control means including means for storing said precalculated light level and said precalculated shutter speed, said control means further including means for updating said stored light level and said stored shutter speed.

11. The automated system of claim 9, wherein said control means includes means for counting the number of photographs taken by said camera.

12. The automated system of claim 9, wherein said camera includes means for time stamping and date stamping each of said photographs of said lightning flash.

13. The automated system of claim 2, wherein said recording means includes a plurality of cameras located within said housing adjacent one of said viewports for visual photographing one of said lightning strike and said subsequent lightning strike in a flash through one of said viewports.

14. The automated system of claim 2, wherein said light detecting means is located within said housing adjacent one of said viewports for receiving light entering through at least one of said viewports.

15. The automated system of claim 2, wherein said recording means includes at least one camera and at least one video camcorder each located within said housing adjacent one of said viewports for at least one of visual photographing and visual recording of said lightning strike and said subsequent lightning strike in a flash through one of said viewports.

16. The automated system of claim 1, wherein said housing is constructed for mounting to a pole.

17. The automated system of claim 16, wherein said pole comprises a power pole.

18. The automated system of claim 1, wherein said housing is constructed such that said housing is capable of being free-standing.

19. The automated system of claim 1, further comprising first protective means, said first protective means coupled to said control means for protecting said control means from said first signal when said first signal is at a level greater than a preselected level.

20. The automated system of claim 1, further including third automated means for detecting current resulting from a lightning strike in the vicinity of said power line, said third automated means outputting a fourth signal representative of said lightning strike when current representative of a lightning strike is detected.

21. The automated system of claim 20, wherein said control means is further coupled to receive the output of said third automated means, said control means outputting said third signal in response to receiving at least one of said first signal, said second signal and said fourth signal.

22. The automated system of claim 20, further comprising second protective means, said second protective means coupled to said control means for protecting said control means from said fourth signal when said fourth signal is at a level greater than a preselected level.

23. The automated system of claim 1, further comprising means for supplying power to said system.

24. The automated system of claim 23, wherein said power supplying means includes a collector driven by solar power.

25. An automated system for detecting and recording lightning strikes in the vicinity of a power line, said system comprising:
   automated means for detecting a lightning strike in the vicinity of said power line, said automated detecting means outputting a first signal representative of said lightning strike when said lightning strike is detected;
   control means coupled to receive the output of said automated detecting means, said control means outputting a second signal in response to receipt of said first signal;
   means responsive to the output of said control means for visually recording at least one of said lightning strike and a subsequent lightning strike in a flash in the vicinity of said power line, said recording means including a video camcorder for visual recording of at least one of said lightning strike and said subsequent lightning strike in a flash; and
   wherein said control means includes timing circuitry for controlling activation of said camcorder to record at least one of said lightning strike and said subsequent lightning strike in a flash in the vicinity of said power line, said timing circuitry including means for continuing camcorder activation for a preselected amount of time.

26. The automated system of claim 25, wherein said timing circuitry includes means for terminating said camcorder activation after a preselected amount of time.

27. The automated system of claim 25, wherein said automated means includes at least one of means for detecting a magnetic field disturbance resulting from said lightning strike in the vicinity of said power line, means for detecting light resulting from said lightning strike in the vicinity of said power line and means for detecting current resulting from said lightning strike in the vicinity of said power line.

28. The automated system of claim 25, further comprising a housing having at least one viewport.

29. The automated system of claim 28, wherein said housing has a top, a bottom and at least one side wall, said housing including a plurality of viewports, each of said viewports being positioned in one of said top, said bottom and said side wall.

30. The automated system of claim 28, wherein said housing is constructed for mounting on a pole.

31. The automated system of claim 30, wherein said pole comprises a power pole.

32. The automated system of claim 30, wherein said housing is constructed such that said housing is capable of being free-standing.

33. The automated system of claim 25, wherein said recording means includes at least one of a video camcorder and a camera, said at least one of said video camcorder and camera being located within said housing adjacent one of said viewports for visual recording of at least one of said lightning strike and said subsequent lightning strike in a flash through said viewport.

34. An automated system for detecting and recording lightning strikes in the vicinity of a power line, said system comprising:
   a housing having a viewport;
   automated means for detecting a lightning strike in the vicinity of said power line, said automated detecting means outputting a first signal representative of said lightning strike when said lightning strike is detected;
   control means coupled to receive the output of said automated means, said control means outputting a second signal in response to receipt of said first signal;
   means responsive to the output of said control means for visually recording at least one of said lightning strike and a subsequent lightning strike in a flash in the vicinity of said power line, said recording means being located within said housing adjacent said viewport for visual recording of at least one of said lightning strike and said subsequent lightning strike in a flash through said viewport, said recording means including at least one camera having a light level and a shutter speed, said at least one camera being activated upon receipt of said second signal; and
   wherein said control means further includes means for precalculating said light level and said shutter speed on a periodic basis.

35. The automated system of claim 34, wherein said housing has a top, a bottom and at least one side wall, said housing including a plurality of viewports, each of said viewports being positioned in one of said top, said bottom and said side wall.

36. The automated system of claim 35, wherein said recording means includes a plurality of cameras, said cameras being located within said housing adjacent one of said viewports for visual photographing of said lightning strike and said subsequent lightning strike in a flash through one of said viewports.

37. The automated system of claim 34, wherein said control means further includes means for storing said precalculated light level and said precalculated shutter speed, said control means further including means for updating said stored light level and said stored shutter speed.

38. The automated system of claim 34, wherein said housing is constructed for mounting to a pole.

39. The automated system of claim 34, wherein said housing is constructed such that said housing is capable of being free-standing.

* * * * *

UNITED STATES PATENT AND TRADEMARK OFFICE
CERTIFICATE OF CORRECTION

PATENT NO. : 5,184,215
DATED : February 2, 1993
INVENTOR(S) : Philip P. Barker

It is certified that error appears in the above-indentified patent and that said Letters Patent is hereby corrected as shown below:

On the title page, Abstract, line 6, delete "circuit for," and replace with --circuit;--

Column 4, line 50, delete "B/6" and replace with --B/S--

Column 9, lines 40 and 41, delete "saidrecording" and replace with -- said recording--

Column 12, line 1, delete "claim 30" and replace with --claim 28--

Signed and Sealed this

Twelfth Day of July, 1994

Attest:

BRUCE LEHMAN

*Attesting Officer*  *Commissioner of Patents and Trademarks*